United States Patent
Shin et al.

(10) Patent No.: US 10,927,293 B2
(45) Date of Patent: Feb. 23, 2021

(54) FLUORESCENT CONJUGATE, OPTICAL CONVERSION FILM, OPTICAL CONVERSION DEVICE AND DISPLAY DEVICE COMPRISING SAME

(71) Applicant: LG CHEM, LTD., Seoul (KR)

(72) Inventors: Du Hyeon Shin, Daejeon (KR); Youkyong Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/579,157

(22) PCT Filed: Jun. 14, 2016

(86) PCT No.: PCT/KR2016/006284
§ 371 (c)(1),
(2) Date: Dec. 1, 2017

(87) PCT Pub. No.: WO2016/204476
PCT Pub. Date: Dec. 22, 2016

(65) Prior Publication Data
US 2018/0134953 A1 May 17, 2018

(30) Foreign Application Priority Data

Jun. 15, 2015 (KR) .................. 10-2015-0084517

(51) Int. Cl.
*C09K 11/06* (2006.01)
*C09K 11/02* (2006.01)
(Continued)

(52) U.S. Cl.
CPC .......... *C09K 11/06* (2013.01); *B29D 11/0073* (2013.01); *B32B 27/00* (2013.01);
(Continued)

(58) Field of Classification Search
None
See application file for complete search history.

(56) References Cited

U.S. PATENT DOCUMENTS 6,013,531 A * 1/2000 Wang .................. C08F 257/02
435/967
2004/0139565 A1 * 7/2004 Banerjee .................. D06P 1/926
8/509
(Continued)

FOREIGN PATENT DOCUMENTS

CN 1767941 5/2006
CN 103484101 1/2014
(Continued)

OTHER PUBLICATIONS

English abstract of Liu et al. (CN 103286312), Sep. 2013 (Year: 2013).*
(Continued)

*Primary Examiner* — Ronak C Patel
(74) *Attorney, Agent, or Firm* — Dentons US LLP (57) ABSTRACT

Provided is a core-shell structured fluorescent complex comprising: a core portion comprising therein a polymer and a fluorescent material; and a shell portion including silica or alumina covering at least a part of a surface of the core portion, wherein the fluorescent material is included in greater than or equal to 0.01 parts by weight and less than or equal to 50 parts by weight with respect to 100 parts by weight of the polymer, and wherein the polymer is an ionic polymer or ionic polymer resin and has a weight average molecular weight of greater than or equal to 1,000 and less than or equal to 300,000, a light conversion film including the core-shell structured fluorescent complex, and an electronic device including the same.

15 Claims, 5 Drawing Sheets

(51) Int. Cl.
*F21V 9/45* (2018.01)
*G02B 6/00* (2006.01)
*B32B 27/00* (2006.01)
*B29D 11/00* (2006.01)
*G02F 1/13357* (2006.01)

(52) U.S. Cl.
CPC ............ *C09K 11/02* (2013.01); *C09K 11/025* (2013.01); *F21V 9/45* (2018.02); *G02B 6/00* (2013.01); *C09K 2211/1416* (2013.01); *G02F 2001/133614* (2013.01); *G02F 2202/36* (2013.01)

(56) References Cited

U.S. PATENT DOCUMENTS

| | | | |
|---|---|---|---|
| 2006/0183246 | A1 | 8/2006 | Wiesner et al. |
| 2011/0177339 | A1* | 7/2011 | Lu .......................... B82Y 15/00 428/403 |
| 2012/0292572 | A1 | 12/2012 | Yang et al. |
| 2015/0125539 | A1* | 5/2015 | Popov .................. A61K 9/0048 424/497 |
| 2015/0152322 | A1 | 6/2015 | Nakayama et al. |
| 2015/0265728 | A1* | 9/2015 | Ishow ................ A61K 49/1878 424/9.322 |
| 2015/0289372 | A1* | 10/2015 | Deng ..................... G01N 21/95 361/679.02 |

FOREIGN PATENT DOCUMENTS

| | | |
|---|---|---|
| JP | 2006517985 | 8/2006 |
| JP | 2011-241160 | 12/2011 |
| KR | 10-0507844 | 8/2005 |
| KR | 10-1129521 | 3/2012 |
| KR | 10-2015-0008738 | 1/2015 |
| KR | 10-2015-0036211 | 4/2015 |

OTHER PUBLICATIONS

Office Action of Korean Patent Office in Appl'n No. 10-2016-0057659 dated Jun. 20, 2018.
Qian et al., "Mesoporous-Silica-Coated Up-Conversion Fluorescent Nanoparticles for Photodynamic Therapy," Fluorescent Nanoparticles for Photodynamic Therapy 5(20): 2285-2290 (2009).
Zhang et al., "Multifunctional fluorescent-magnetic polyethyleneimine functionalized Fe3O4-mesoporous silica yolk-shell nanocapsules for siRNA delivery," Chem Commun. 48: 8706-8708 (2012).
Office Action of Chinese Patent Office in Appl'n No. 201680034597.9, dated Mar. 24, 2020.

* cited by examiner

FLUORESCENT CONJUGATE, OPTICAL CONVERSION FILM, OPTICAL CONVERSION DEVICE AND DISPLAY DEVICE COMPRISING SAME

This application is a National Stage Application of International Application No. PCT/KR2016/006284 filed on Jun. 14, 2016, which claims priority to and the benefits of Korean Patent Application No. 10-2015-0084517, filed with the Korean Intellectual Property Office on Jun. 15, 2015, both of which are incorporated herein in their entirety by reference for all purposes as if fully set forth herein.

TECHNICAL FIELD

The present specification claims priority to and the benefits of Korean Patent Application No. 10-2015-0084517, filed with the Korean Intellectual Property Office on Jun. 15, 2015, the entire contents of which are incorporated herein by reference.

The present specification relates to a fluorescent complex, a light conversion film, a light conversion device and a display apparatus including the same.

BACKGROUND ART

Fluorescent dyes have been used mainly as an indicator in the biotechnology filed such as bioimaging, biochips and biosensors. Particularly, in order to reduce a photobleaching phenomenon of fluorescent dyes, the fluorescent dyes have been used while being fixed on various inorganic supports such as silica and iron oxide to induce selective adsorption of target materials such as antibodies and proteins while maintaining light emitting properties of the dye itself. High durability is not required for fluorescent dyes when used as a bio indicator, however, in order to be used as a light conversion film for a display operated under a harsh condition, durability for moisture, oxygen and particularly for UV is considerably required.

PRIOR ART DOCUMENTS

Patent Documents

US Patent Application Laid-Open Publication No. 2008-0023646

DISCLOSURE

Technical Problem

The present specification is directed to providing a fluorescent complex, a light conversion film, a light conversion device and a display apparatus including the same.

Technical Solution

One embodiment of the present specification provides a core-shell structured fluorescent complex including a core portion including a polymer and a fluorescent material; and a shell portion including silica or alumina covering at least a part of a surface of the core portion.

Another embodiment of the present specification provides a light conversion film including a core-shell structured fluorescent complex including a core portion including a polymer and a fluorescent material; and a shell portion including silica or alumina covering at least a part of a surface of the core portion, or a cured material thereof.

Another embodiment of the present specification provides a light conversion device including a light conversion film including a core-shell structured fluorescent complex including a core portion including a polymer and a fluorescent material; and a shell portion including silica or alumina covering at least a part of a surface of the core portion, or a cured material thereof.

Another embodiment of the present specification provides a display apparatus including a light conversion device including a light conversion film including a core-shell structured fluorescent complex including a core portion including a polymer and a fluorescent material; and a shell portion including silica or alumina covering at least a part of a surface of the core portion, or a cured material thereof.

Advantageous Effects

According to embodiments of the present specification, an advantage of blocking moisture, oxygen and UV is obtained by effectively loading the fluorescent dye into a polymer resin, and protecting the fluorescent dye-loaded polymer resin using a shell portion including silica or alumina. Accordingly, an advantage of providing a fluorescent complex having increased fluorescent dye durability while having excellent light conversion efficiency is obtained.

MODE FOR DISCLOSURE

One embodiment of the present specification provides a core-shell structured fluorescent complex including a core portion including a polymer and a fluorescent material; and a shell portion including silica or alumina covering at least a part of a surface of the core portion.

The fluorescent material may be a fluorescent dye, and the fluorescent material may be loaded into the polymer resin. Specifically, the fluorescent dye may be loaded between main chains of the polymer or loaded into space between a main chain and a side chain of the branched polymer.

In another embodiment of the present specification, the polymer may be an ionic polymer resin or a polymer precursor.

The ionic polymer or the ionic polymer resin is not limited as long as it is a polymer exhibiting an anionic property or a cationic property in an aqueous solution state, and ionic polymers commonly used in the art may be included. Specifically, as the ionic polymer, polyacrylamide, polyacrylic acid, polysilicic acid, polymaleic acid, polyamine, polyamideamine, PAMAM dendrimer derivatives and the like may be used, however, the ionic polymer is not limited thereto.

In the present specification, a precursor may refer to a material in a stage prior to becoming a specific material finally obtainable through a reaction such as a chemical reaction. Herein, the precursor is not necessarily a last material of a certain reaction, and may refer to a material obtainable in a certain stage arbitrarily determined.

The polymer precursor may refer to a high molecular weight organic material converted to a polymer through a chemical reaction such as heat, light or a catalyst. The polymer precursor may be a prepolymer, and may refer to a preliminary polymer stopping a polymerization or polycondensation reaction at a proper stage. The polymer precursor is not limited as long as it is capable of forming the polymer described above, and may include a monomer or an oligomer.

In another embodiment of the present specification, the fluorescent material may be an ionic organic fluorescent material. The fluorescent material is not limited as long as it is an ionic organic fluorescent material exhibiting an anionic property or a cationic property in an aqueous solution state, and may be selected from among pyrene-based, pyrrole-based derivatives, acridine-based, xanthene-based, arylmethane-based, coumarin-based, polycyclic aromatic hydrocarbon-based and polycyclic heteroaromatic-based.

Specifically, as the organic fluorescent material, dyes selectively absorbing light in a region from near-ultraviolet to visible, and emitting light having a wavelength different from the absorbed light may be used. For example, as the dye, green light emitting fluorescent dyes having a maximum light emission wavelength between 500 nm to 550 nm may be used, and although not particularly limited thereto, pyrene-based, pyrrole-based derivatives or the like are preferred, and more preferably, those having a light emission wavelength full width at half maximum (FWHM) of 55 nm or less and a molecular absorption coefficient of 50,000 $M^{-1}cm^{-1}$ to 150,000 $M^{-1}cm^{-1}$ may be used. The dye may include two or more types of dyes that are different from each other. Specifically, the dye may be 1-hydroxy-3,6,8-pyrene sulfonic acid (HIPS).

When the polymer is a cationic polymer, the organic fluorescent material is preferably an anionic organic fluorescent material, and when the polymer is an anionic polymer, the organic fluorescent material is preferably a cationic organic fluorescent material, however, the polymer is not limited thereto.

In one embodiment of the present specification, the polymer may have a weight average molecular weight of greater than or equal to 1,000 and less than or equal to 300,000, specifically greater than or equal to 1,000 and less than or equal to 100,000, and more specifically greater than or equal to 1,000 and less than or equal to 50,000. When the polymer is a polymer precursor, the weight average molecular weight may be greater than or equal to 1,000 and less than or equal to 30,000 and more specifically greater than or equal to 1,000 and less than or equal to 10,000.

In one embodiment of the present specification, the silica may be formed using alkoxysilane. The alkoxysilane may form silica through a silane reaction. In other words, the shell portion of the present specification may include silica.

In another embodiment of the present specification, the alkoxysilane includes one or more selected from the group consisting of $-NH_2$, $-SH$, $-SO_3H$, $-OH$, $-NH_4^+$ and R, and herein, R may be saturated hydrocarbon having 1 to 10 chains.

As the alkoxysilane forms the shell outside the core portion, some may form silica or a silica shell. Herein, the substituents may enhance particle dispersibility or induce a secondary reaction while being present outside the core-shell structure. In another embodiment of the present specification, the alumina may be formed with an alumina precursor.

In another embodiment of the present specification, the fluorescent material may be included in greater than or equal to 0.01 parts by weight and less than or equal to 50 parts by weight with respect to 100 parts by weight of the polymer. When the fluorescent material is brought into the polymer in the above-mentioned range, there is an advantage in that a core portion of the fluorescent complex having outstanding durability while having an excellent fluorescent material light emitting property is formed.

When the fluorescent material is included in the above-mentioned range with respect to 100 parts by weight of the polymer, the fluorescent material may maintain excellent light emitting properties without changing the intrinsic light emission wavelength that the fluorescent material has, that is, λmax. In addition, the fluorescent material being included in the above-mentioned range has an advantage of preventing a fluorescent intensity decrease by preventing quenching occurring due to the introduction of excessive amount.

The core portion may be prepared by adding the fluorescent complex to a reactor in which the polymer is dissolved, and stirring the result. Herein, a crosslinking agent for curing the core portion may be further included, and by drying after heating and solidification, a fluorescent dye-loaded polymer powder may be obtained. Herein, as the solvent dissolving the polymer, those generally used in the art may be used without limit. For example, water, DMF, DMSO, ethanol, methanol and the like capable of dissolving the polymer may be used, and a mixed solvent mixing two or more types of the solvents described above may also be used.

The shell portion may be formed by placing the fluorescent dye-loaded polymer powder, that is, the core portion, in water and stirring the result, then slowly adding the silica or the alumina thereto, and reacting the result at a proper temperature. The method of adding the silica or the alumina may be a dropping method, and the temperature may be from 70° C. to 150° C. and specifically 100° C. After terminating the reaction, the result is filtered, and the obtained powder is dried at a proper temperature to obtain the fluorescent complex having a core-shell structure. The filtering may include a filtration method such as a membrane filtration method or a vacuum filtration method, but is not limited thereto.

In one embodiment of the present specification, the core portion may further include a crosslinking agent. The crosslinking agent is not limited as long as it is capable of forming crosslinkage by moisture, a photoinitiator or a thermal initiator, and may be a curable resin. Examples of the curable resin may include one or more types selected from the group consisting of compounds obtained by esterifying a polyalcohol using α,β-unsaturated carboxylic acid such as hexanediol di(meth)acrylate, ethylene glycol di(meth)acrylate, polyethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethyl phthalic acid, propylene glycol di(meth)acrylate having 2 to 14 propylene groups, dipentaerythritol penta(meth)acrylate, dipentaerythritol hexa(meth)acrylate, and a mixture of acidic modification of dipentaerythritol penta(meth)acrylate and dipentaerythritol hexa(meth)acrylate (as a trade name, TO-2348, TO-2349 of TOAGOSEI CO., LTD of Japan); compounds obtained by adding (meth)acrylic acid to a glycidyl group-containing compound such as trimethylolpropane triglycidyl ether acrylic acid adducts, and bisphenol A diglycidyl ether acrylic acid adducts; ester compounds of polycarboxylic acid and a compound having a hydroxyl group or an ethylenically unsaturated bond, or adducts with polyisocyanate such as phthalic acid diester of β-hydroxyethyl (meth)acrylate, and toluene diisocyanate adducts of β-hydroxyethyl (meth)acrylate; (meth)acrylic acid alkyl ester such as methyl (meth)acrylate, ethyl (meth)acrylate, butyl (meth)acrylate, and 2-ethylhexyl (meth)acrylate; and 9,9'-bis[4-(2-acryloyloxyethoxy)phenyl]fluorene. However, the curable resin is not limited thereto, and those generally known in the art may be used. Specifically, the crosslinking agent may be 3-triethoxypropyl isocyanate.

In another embodiment of the present specification, the crosslinking agent may be included in greater than or equal to 0.5 parts by weight and less than or equal to 100 parts by weight with respect to 100 parts by weight of the polymer. The crosslinking agent being included in the above-mentioned range has an advantage of increasing durability by properly curing the core portion including the fluorescent dye and the fluorescent dye-loaded polymer.

For example, although not limited thereto, when using polyethyleneimine as a cationic polymer and using 3-triethoxypropyl isocyanate as an anion-based fluorescent dye and a crosslinking agent, a state of the fluorescent dye attaching to the cation-exhibiting amine group of the polyethyleneimine through ionic bonds may be obtained. Herein, when reacting the 3-triethoxypropyl isocyanate, a solid core portion loading the fluorescent dye may be formed. The isocyanate group participates in the reaction with the amine group in the polyethyleneimine, and the triethoxysilylpropyl group faces outside the core, and the triethoxysilylpropyl group reacts with orthosilicate (TEOS) afterward enabling the formation of a silica shell or an alumina shell outside the core.

In one embodiment of the present specification, the core portion may have a particle diameter of greater than or equal to 1 nm and less than or equal to 10 μm. The core portion having a particle diameter in the above-mentioned range has an advantage of preparing a fluorescent complex having excellent durability while having excellent light conversion efficiency.

The particle diameter of the core portion may be, although not limited thereto, measured after imaging using dynamic light scattering (DLS) measuring equipment, SEM and TEM.

In another embodiment of the present specification, the shell portion may have a thickness of greater than or equal to 0.1 nm and less than or equal to 1 μm. The shell portion having a thickness in the above-mentioned range has an advantage of sufficiently protecting the core portion. The thickness of the shell portion may mean, from one point of the shell portion adjoining the core portion, an average of the length of a straight-line distance between a surface including the point and a surface parallel to the surface and including an outermost one point of the shell portion.

The thickness of the shell portion may be measured using TEM, however, the measurement is not limited thereto.

One embodiment of the present specification may include the silica or the alumina in the shell portion in greater than or equal to 0.1 parts by weight and less than or equal to 100 parts by weight with respect to 100 parts by weight of the whole core portion. The silica or the alumina being included in the shell portion in the above-mentioned numerical range has an advantage of increasing fluorescent dye durability by protecting the core portion including the fluorescent dye loaded in the polymer through effectively blocking from moisture, oxygen and UV without decreasing light conversion efficiency of the fluorescent dye.

One embodiment of the present specification provides a light conversion film including the fluorescent complex described above or a cured material thereof. For example, the light conversion film may include the fluorescent complex as it is, or may also include a cured material curing the fluorescent complex depending on the types of polymers included in the fluorescent complex, an added binder resin or other additives.

In another embodiment of the present specification, the light conversion film may include a cured material of a composition including a binder resin, a polymerizable monomer, a light diffusion agent and a polymerization initiator, and having a haze value of 60% to 90%. For example, the light conversion film may include a cured material of a composition including the fluorescent complex and a binder resin, and, as necessary, a polymerizable monomer, a polymerization initiator and/or a solvent as necessary.

The light diffusion agent is a material capable of controlling a target level of light penetration by evenly diffusing incident light, and although the types are not particularly limited, may be any one selected from the group consisting of silicone-based, acryl-based and calcium carbonate-based.

In addition, inclusion of the degree of the light diffusion agent may affect the haze value, and, according to one embodiment of the present specification, the haze value may be from 60% to 90%, specifically from 65% to 85%, and more specifically from 70% to 80%.

As the binder resin, a photocurable resin, a thermosetting resin, a thermoplastic resin and the like may be used, however, the binder resin is not limited thereto. Specifically, a water-soluble polymer may be used as the binder resin, and although only one type may be used, two or more types may be used together.

The light conversion film may further include additives, and as the additives, one or more types of various additives such as a heat stabilizer, a curing agent, an infrared absorbent, an ultraviolet absorbent, an antioxidant, a surfactant, an antistatic agent, a flame retardant, a lubricant, a heavy metal inactivator, hydrotalcite, organic carboxylic acid, a coloring agent, a processing aid, an inorganic additive, a filler, a clarifying agent, a nucleating agent or a crystallization agent may be used, however, the additives are not limited thereto.

In another embodiment of the present specification, the light conversion film may include a substrate provided on one surface thereof. As the substrate, those known in the art may be used without particular limit, however, considering possibility of including the substrate in a final product instead of removing the substrate, the substrate is preferably light penetrable. For example, although not limited thereto, a glass, a quartz, a sapphire or a plastic substrate may be used.

One embodiment of the present specification provides a light conversion film including a core-shell structured fluorescent complex including a core portion including a polymer and a fluorescent material; and a shell portion including silica or alumina covering at least a part of a surface of the core portion, or a cured material thereof. For example, the light conversion film may include the fluorescent complex as it is, or may also include the polymer; or a cured material curing the polymer and the fluorescent complex depending on the types of the polymer included in the dye or an added binder resin or additives in addition thereto.

In another embodiment of the present specification, the light conversion film may include a cured material of a composition including a binder resin, a polymerizable monomer and a polymerization initiator. In addition, the light conversion film may further include additives. Descriptions on the binder resin and the additives are the same as the descriptions provided above.

Including the polymerizable monomer has an advantage of increasing adhesion. The polymerizable monomer is preferably included in 1% to 30% with respect to the polymer weight. When including the polymerizable monomer in the above-mentioned range, a problem of reducing adhesive strength with the film may be prevented. In addition, a problem of significantly decreasing stability and coating property of the composition for forming a light conversion film may be prevented by preventing the curing reaction being progressed at room temperature. As the polymerizable monomer, glycidyls are more preferred, and although not particularly limited thereto, aldehydes, dialdehydes, isocyanates, alcohols and the like may be used.

In another embodiment of the present specification, the light conversion film according to the embodiments described above may include a substrate provided on one surface thereof. Descriptions on the substrate are the same as the descriptions provided above.

Another embodiment of the present specification provides a light conversion device including the light conversion film described above; and a barrier film provided on at least one surface of the light conversion film.

The light conversion device may include the light conversion film in two or more layers. A plurality of the light conversion films may convert light entering from a light source to light each having a different wavelength (color), and in this case, the light conversion device may convert light entering from, for example, a light emitting diode (LED) light source to white light and emit the light.

Figure 1:
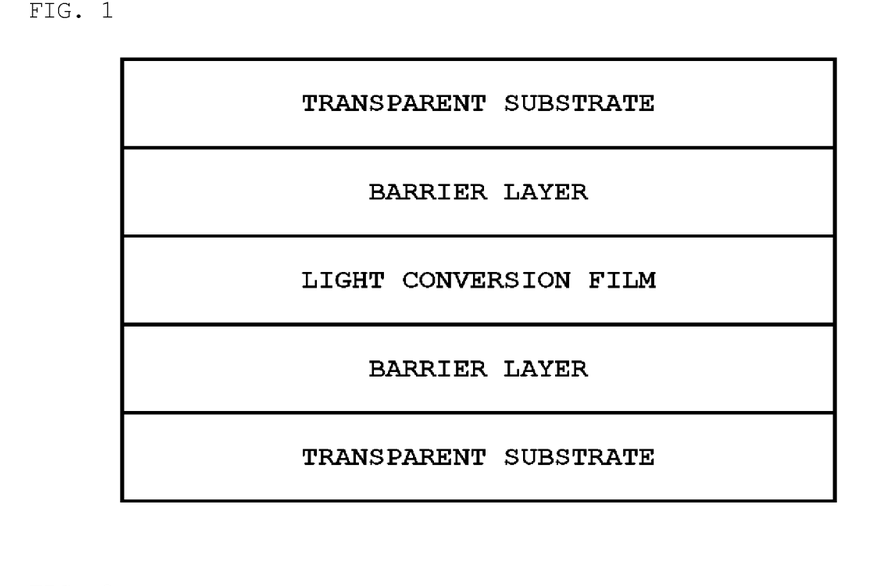
FIGS. 1 to 5 illustrate a laminated structure according to several embodiments of the present specification.

FIG. 1 illustrates a light conversion device according to one embodiment of the present application, and a barrier film including a transparent substrate and a barrier layer is provided on both sides of a light conversion film. Herein, the barrier layer of the barrier film is disposed adjoining the light conversion film.

Oxygen and moisture permeability of the barrier layer may each be, for example, $10^{-1}$ cc/m$^2$/day or less. This is one example of the barrier film, and oxygen and moisture permeability of the barrier layer may have different values with this value.

The barrier film may include a transparent substrate, and a barrier layer formed on one surface of the transparent substrate. The barrier layer is not particularly limited as long as it is capable of blocking moisture or oxygen, and those known in the art may be used. For example, the barrier layer may include aluminum oxide or nitride, and ionic metal oxides providing a moisture or oxygen blocking property. The barrier layer may further include a buffer layer formed with one or more types selected from among sol-gel-based, acryl-based, epoxy-based and urethane-based coating solution compositions as a buffer layer. As one example, the barrier film may include an organic-inorganic hybrid coating layer, an inorganic material layer and a protective coating layer including inorganic nanoparticles of which surfaces are modified with organosilane on one or both surfaces of a base. Herein, the inorganic material layer may be formed with metal oxides or nitrides. The inorganic nanoparticles may be nanoparticles of alumina, silica, zinc oxide, antimony oxide, titanium oxide or zirconium oxide. The organic-inorganic hybrid coating layer may be formed by curing a coating composition in a sol state including organosilane using heat or UV, and the coating solution composition in a sol state may include, together with the organosilane, proper additives, solvents, polymerization catalysts and the like as necessary.

The light conversion device according to FIG. 1 may be formed by coating a composition including a composition for a light conversion film including the dye complex described above and a binder resin, a polymerizable monomer and a polymerizable initiator on a barrier film including a transparent substrate and a barrier layer, curing or drying the result as necessary to prepare a light conversion film, and then laminating a barrier film including a transparent substrate and a barrier layer on the light conversion film. Herein, lamination of the light conversion film and the barrier film may be carried out without an aid of a separate gluing agent or adhesive. When curing is carried out after coating the composition, the curing method and condition may be determined depending on the types of the binder resin or other components. The transparent substrate may include a resin such as PET, but is not limited thereto, and transparent plastic films or substrates known in the art may be used. In FIG. 1, the light conversion film is illustrated in one layer, however, two or more layers of the light conversion films may be laminated as necessary.

Figure 2:
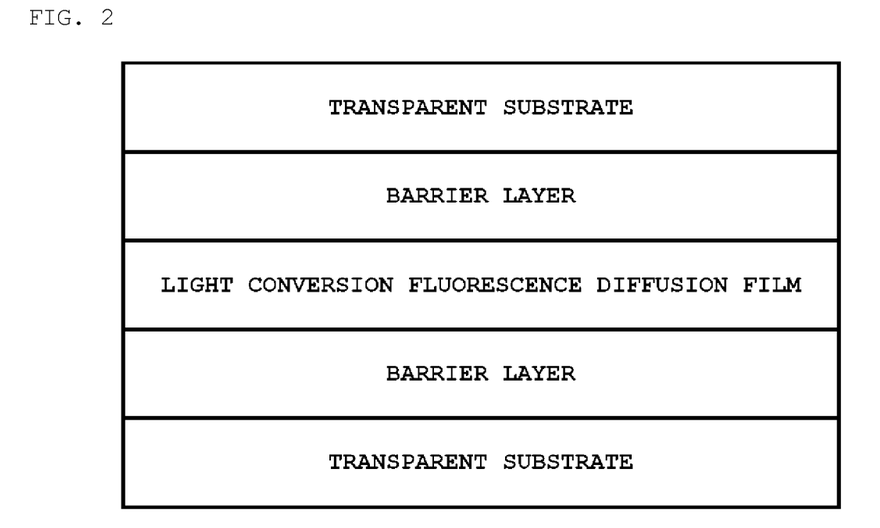

In the light conversion device according to FIG. 2, the light conversion film is a light conversion fluorescence diffusion film including one or more types of light diffusion particles. In other words, the light conversion film included in FIG. 2 includes one or more types of organic fluorescent dyes, one or more types of light diffusion particles and a polymer medium including one or more types of ionic polymers. The light diffusion particles perform a role of diffusing light entering from a light source inside the light conversion film. Herein, the light diffusion particles may include TiO$_2$ or silica particles, but are not limited thereto. As for the barrier film including a transparent substrate and a barrier layer, the organic fluorescent dye, the polymer medium and the like, the descriptions provided above may be used.

Figure 3:
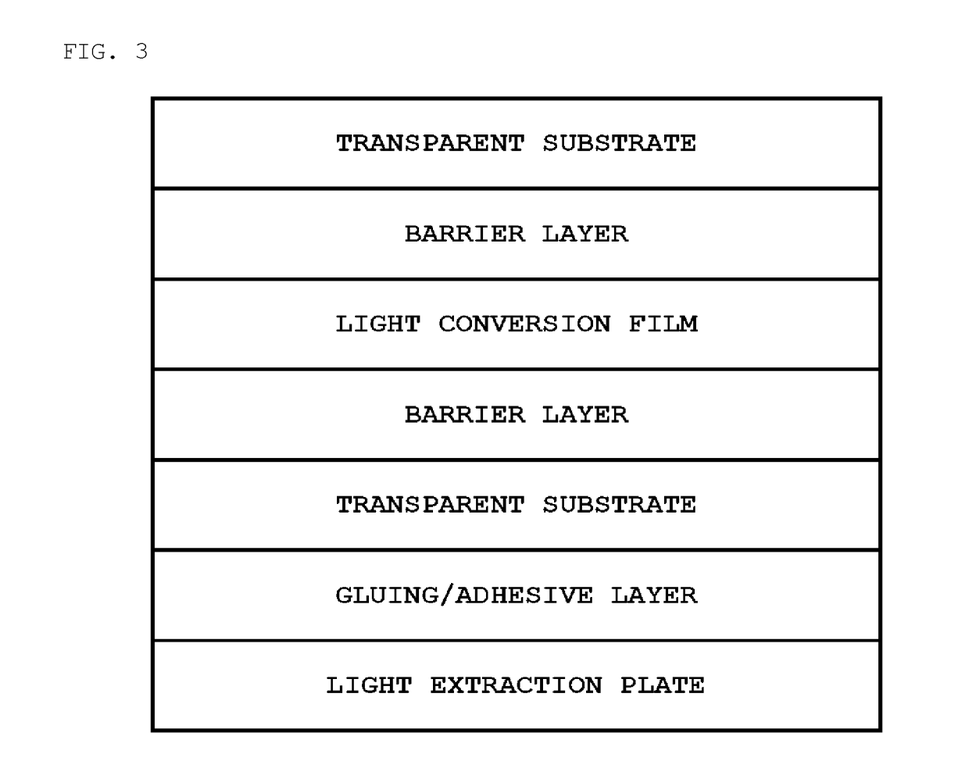

The light conversion device according to FIG. 3 further includes a light extraction plate. Specifically, in a structure laminating a barrier film including a transparent substrate and a barrier layer on both surfaces of a light conversion film, a gluing layer or an adhesive layer is provided on a surface of any one of the barrier films opposite to the surface facing the light conversion film, and a light extraction plate is attached hereto. The light extraction plate is for enhancing conversion efficiency of the light conversion film, and is not particularly limited as long as it is known in the art.

Figure 4:
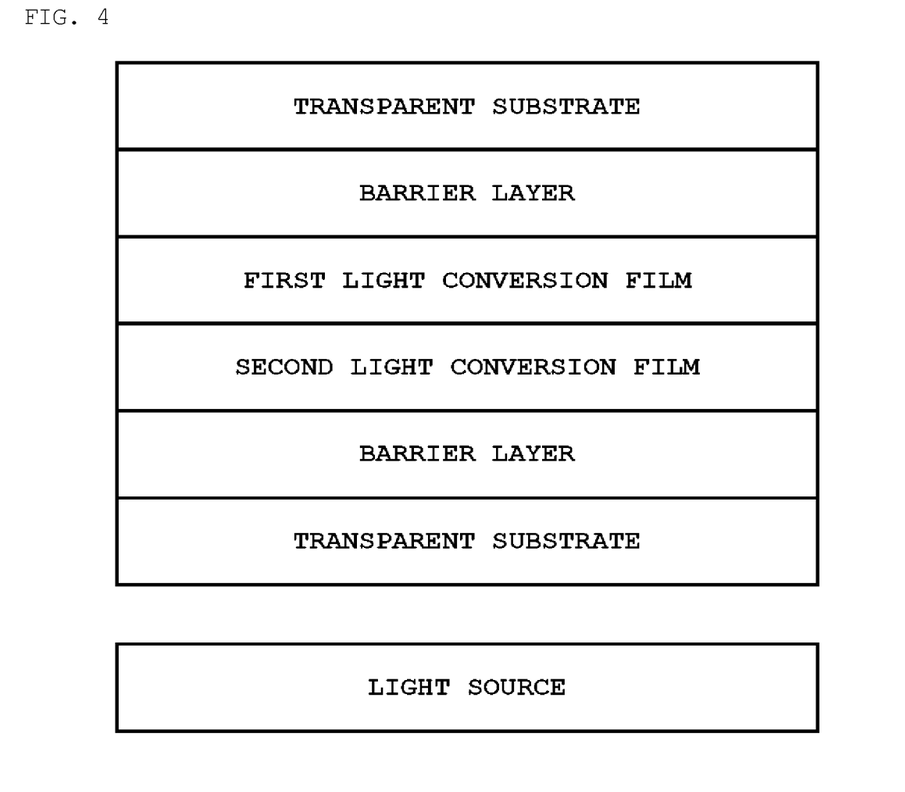

Meanwhile, FIG. 4 illustrates a structure of a light conversion device in which a plurality of light conversion films are consecutively disposed. Specifically, the light conversion device includes a barrier film including a transparent substrate and a barrier layer formed on the transparent substrate; a first light conversion film coated on the barrier film; and a second light conversion film prepared in the same manner on the first light conversion film.

Descriptions on the first light conversion film and the second light conversion film are the same as the descriptions on the light conversion film provided above, and the first light conversion film and the second light conversion film may be formed with the same dye complex, or may also be formed with different dye complexes. As illustrated in FIG. 4, the second light conversion film may be directly laminated and disposed on the first light conversion film. However, the scope of the present disclosure is not limited to FIG. 4, and the first light conversion film and the second light conversion film may be disposed apart from each other. In this case, other additional films may be provided between the first light conversion film and the second light conversion film. In addition, in FIG. 4, a structure including two light conversion films is illustrated, however, three or more light conversion films may be laminated as necessary.

Figure 5:
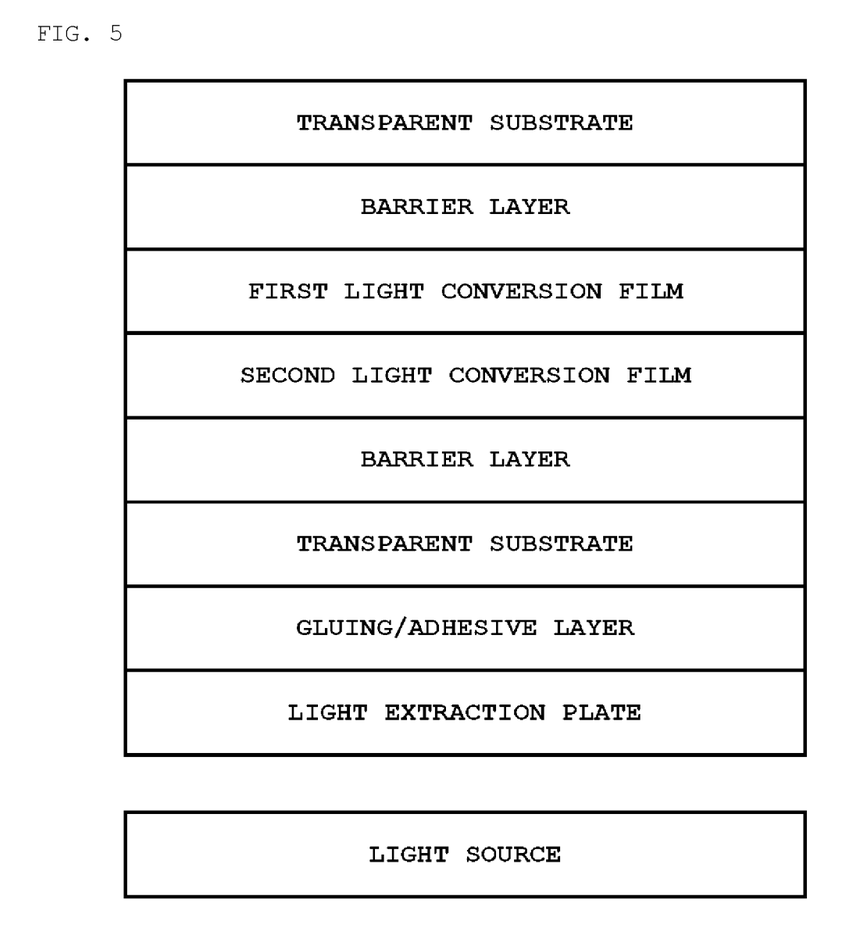

The light conversion device including a plurality of light conversion films as in FIG. 4 may also further include a light extraction plate attached through a gluing layer or an adhesive layer as in FIG. 3, and such a structure is illustrated in FIG. 5. The light extraction plate extracts light emitted after being converted from light entering from a light source through the light conversion film, and by further including such a light extraction plate, conversion efficiency of the light conversion film may be further enhanced.

In order to enhance light extraction efficiency, the light extraction plate may have a scattered structure on the surface or inside, or may include two or more types of materials having different refractive indexes inside. For example, the light extraction layer may be prepared by coating a composition including scattered particles and a binder on a transparent substrate, and drying or curing the result. When necessary, a planarization layer may be further provided on the coating layer including the scattered particles and the binder. As another example, the light extraction layer may be prepared by forming an unevenness structure on a transparent base through micro-embossing. When necessary, a planarization layer may be further provided on the unevenness structure.

According to one example, a plurality of the light conversion films may be, for example, disposed so as to have a longer light emission wavelength as being further away from a light source, and for example, the first and the second light conversion films may be red and green light conversion films, respectively. As a result, light absorbed from a monochromatic LED light source may be converted to white light while passing through a plurality of the light conversion films. The disposition of a plurality of the light conversion films are for illustrative purposes only, and the disposition and/or the structure of each of the light conversion films for increasing conversion efficiency are not particularly limited as long as they are known in the art.

Another embodiment of the present application provides a backlight unit including the light conversion device described above. The backlight unit may have constitutions known in the art except for the light conversion device. For example, the backlight unit may include an edge-type light source; a light guide plate diffusing light received from the edge-type light source; and the light conversion device provided on one surface of the light guide plate. As another example, the backlight unit may include a direct-type light source and the light conversion device provided on one surface of the direct-type light source. A reflecting plate may also be provided on a surface of the light guide plate opposite to the surface facing the light conversion device, and a light concentrating sheet, a brightness enhancing sheet and the like may be additionally provided on a side of the light conversion device opposite to the surface facing the light source or the light guide plate.

Another embodiment of the present application provides a display apparatus including the backlight unit described above. The display apparatus may have constitutions known in the art except for the light conversion device included in the backlight unit. For example, a display module provided on one surface of the backlight unit may be included. The display module may be a liquid crystal module including a thin film transistor and a color filter.

Hereinafter, the present specification will be described in detail with reference to examples in order to specifically describe the present specification. However, the examples according to the present specification may be modified to various different forms, and the scope of the present specification is not to be construed as being limited to the examples described below. Examples of the present specification are provided in order to more fully describe the present specification to those having average knowledge in the art.

Example 1—Preparation of Fluorescent Dye-Loaded Polymer Complex

Trisodium 1-hydroxy-3,6,8-pyrenesulfonic acid (HPTS) was introduced to a reactor in which 1 g of polyethyleneimine (molecular weight 5,000) was dissolved, and the result was stirred at 500 rpm. After stirring until the HIPS was completely dissolved, 1 g of 3-triethoxypropyl isocyanate was slowly dropped thereto. As the reaction progressed, heat was produced and solidification slowly progressed, and after the reaction was terminated, the result was dried at 75° C. to obtain fluorescent dye-loaded powder.

Example 2—Preparation of Fluorescent Silica Complex Having Core-Shell Structure

The powder prepared in Example 1 was introduced to water and the result was stirred. After that, 0.67 g of tetraethoxysilane was slowly added thereto, and the result was reacted at 100° C. After the reaction was terminated, the result was filter treated, and the powder obtained after filtering was dried at 70° C.

Figure 6:
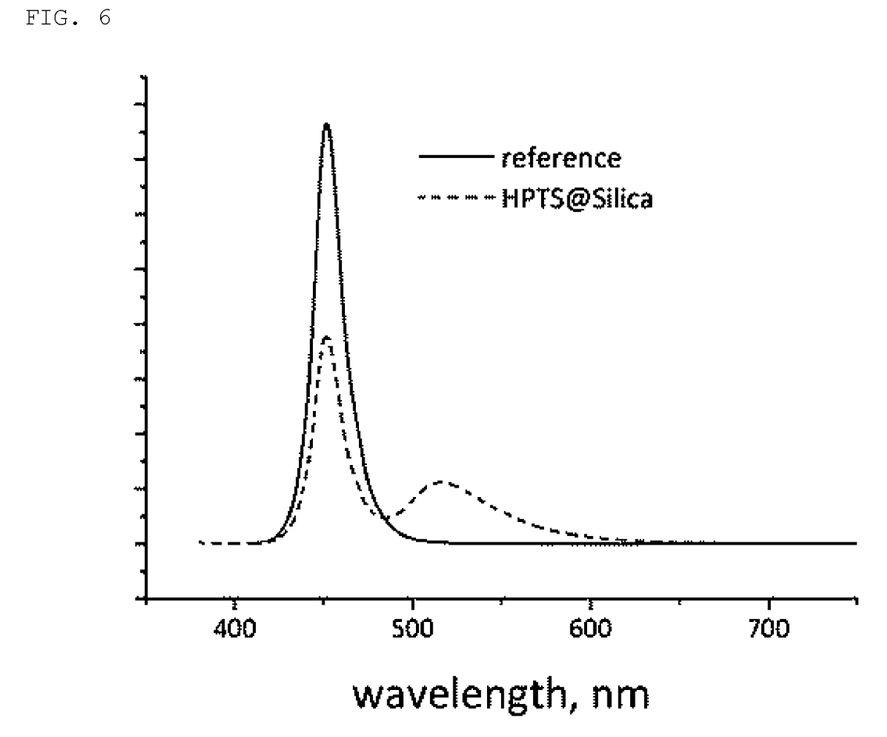
FIG. 6 shows results of measuring light conversion films according to several embodiments of the present specification using a PR-705 spectra scan device.

0.01% of the powder with respect to the solid weight obtained through Example 2 was mixed with and dispersed into a solution in which 25% of SAN resin with respect to the whole solution weight was dissolved in toluene. The result was coated in the above-mentioned composition on a plastic base so as to have a thickness of 10 μm after drying, and then the result was hot air dried for 10 minutes in a drying oven at 100° C. to prepare a light conversion film. The light conversion film was measured using a PR-705 spectra scan device and the results are shown in FIG. 6.

In addition, the green light conversion film prepared as above was placed on a 300 nit blue LED panel installed on a thermos-hygrostat under a temperature condition of 60° C., and changes in the light properties depending on time were observed. The results are shown in the following Table 1.

Example 3—Preparation of Fluorescent Silica Complex Having Core-Shell Structure

The powder prepared in Example 1 was introduced to water and the result was stirred. After that, 0.5 g of aluminum isopropoxide was slowly added thereto, and the result was reacted at 90° C. After the reaction was terminated, the result was filter treated, and the powder obtained after filtering was dried at 70° C.

Comparative Example 1—Preparation of Light Conversion Film Using Fluorescent Dye 0.01% of trisodium 1-hydroxy-3,6,8-pyrenesulfonic acid with respect to the solid weight was mixed with and dissolved in a solution in which 10% of PVA resin with respect to the whole solution weight was dissolved in water. The result was coated in the above-mentioned composition on a plastic base so as to have a thickness of 10 μm after drying, and then the result was hot air dried for 10 minutes in a drying oven at 100° C. to prepare a light conversion film. The light conversion film prepared as above was placed on a 300 nit blue LED panel installed on a thermos-hygrostat under a temperature condition of 60° C., and changes in the light properties depending on time were observed. The results are shown in the following Table 1.

Comparative Example 2—Preparation of Light Conversion Film Using Fluorescent Dye-Loaded Polymer Complex 0.01% of the powder with respect to the solid weight obtained through Example 1 was mixed with and dispersed into a solution in which 25% of SAN resin with respect to the whole solution weight was dissolved in toluene. The result was coated in the above-mentioned composition on a plastic base so as to have a thickness of 10 µm after drying, and then the result was hot air dried for 10 minutes in a drying oven at 100° C. to prepare a light conversion film. The light conversion film prepared as above was placed on a 300 nit blue LED panel installed on a thermos-hygrostat under a temperature condition of 60° C., and changes in the light properties depending on time were observed. The results are shown in the following Table 1.

TABLE 1

|  | Luminance | |
| --- | --- | --- |
|  | 0 Hours | 500 Hours |
| Comparative Example 1 | 100% | 0% |
| Comparative Example 2 | 100% | 40% |
| Example 2 | 100% | 76% |

Table 1 shows changes in the luminance with the passage of time for each of the examples and the comparative examples over 500 hours under a 60° C. lightfastness condition. As shown in Table 1, in Comparative Example 1, HPTS included in the PVA resin was completely oxidized and decomposed and lost its fluorescent properties after 240 hours had passed. However, it was identified that the light conversion film of Comparative Example 2 dispersing on the SAN resin using the fluorescent dye-loaded polymer complex powder maintained at least 40% of its fluorescent properties up to 500 hours, and this was due to the fact that oxidation of the fluorescent dye caused by light and heat was delayed by partially blocking the contact of the fluorescent dye including the polymer complex inside with external oxygen, moisture or the like.

Unlike the results of the comparative examples, the light conversion film using powder having a core-shell form surrounding outside the polymer complex with silica had maintained 76% of its fluorescent properties even after 500 hours had passed, and from this result, it was identified that the silica shell outside the polymer complex more effectively blocked the contact with external oxygen or moisture.

The invention claimed is:

1. A core-shell structured fluorescent complex comprising: a core portion comprising therein a polymer and a fluorescent material; and a shell portion including silica or alumina covering at least a part of a surface of the core portion, wherein the fluorescent material is included in greater than or equal to 0.01 parts by weight and less than or equal to 50 parts by weight with respect to 100 parts by weight of the polymer, and wherein the polymer is an ionic polymer or ionic polymer resin and has a weight average molecular weight of greater than or equal to 1,000 and less than or equal to 300,000.

2. The fluorescent complex of claim 1, wherein the fluorescent material is an ionic organic fluorescent material.

3. The fluorescent complex of claim 1, wherein the silica is formed using alkoxysilane.

4. The fluorescent complex of claim 3, wherein the alkoxysilane includes one or more selected from the group consisting of —$NH_2$, —SH, —$SO_3H$, —OH, —$NH_4^+$ and R, and R is saturated hydrocarbon having 1 to 10 carbon chains.

5. The fluorescent complex of claim 1, wherein the alumina is formed with an alumina precursor.

6. The fluorescent complex of claim 1, wherein the core portion further includes a crosslinking agent.

7. The fluorescent complex of claim 6, wherein the crosslinking agent is included in greater than or equal to 0.5 parts by weight and less than or equal to 100 parts by weight with respect to 100 parts by weight of the polymer.

8. The fluorescent complex of claim 1, wherein the core portion has a particle diameter of greater than or equal to 1 nm and less than or equal to 10 µm.

9. The fluorescent complex of claim 1, wherein the shell portion has a thickness of greater than or equal to 0.1 nm and less than or equal to 1 µm.

10. The fluorescent complex of claim 1, wherein the silica or the alumina included in the shell portion in greater than or equal to 0.1 parts by weight and less than or equal to 100 parts by weight with respect to 100 parts by weight of the whole core portion.

11. A light conversion film comprising the fluorescent complex of claim 1.

12. The light conversion film of claim 11, comprising a substrate provided on one surface of the light conversion film.

13. A light conversion device comprising:
the light conversion film of claim 11; and
a barrier film provided on at least one surface of the light conversion film.

14. A backlight unit comprising the light conversion device of claim 13.

15. A display apparatus comprising the backlight unit of claim 14.

* * * * *